United States Patent Office.

HIRAM S. UTLEY, OF CHICAGO, ILLINOIS.

METHOD OF PRODUCING IMITATION STONE.

SPECIFICATION forming part of Letters Patent No. 315,188, dated April 7, 1885.

Application filed January 13, 1885. (Specimens.)

*To all whom it may concern:*

Be it known that I, HIRAM S. UTLEY, a citizen of the United States, residing in Chicago, county of Cook, and State of Illinois, have invented a certain new and useful Improvement in Methods of Producing Imitations of Stone, of which the following is a specification.

This invention relates to an improvement in producing imitation stone in which sheets or slabs of glass have been employed as a base and to give a polished finish to the same.

The special object of this invention is to produce, as nearly as possible and at a small expense, an exact imitation of differing grades or kinds or colors of granite in a polished state; and to this end the essentials are sheet or other form of glass, colored and white varnish, with an intermediate layer of granulated porcelain and slate, and enough sand or other absorbent to take up an excess of the colored varnish.

In carrying out the invention a coat of varnish, preferably what is commonly known as "white varnish," is applied to one side of glass in sheet or other form, and on this coating before dry is sprinkled or sifted granulated porcelain mixed with slate in a similar form. After these granulated substances are well set, and before the varnish hardens, a second coat of white varnish is applied to fill the interstices between and glaze the granulated substances, and afterward when the second coat is set a colored varnish is applied to constitute a background imitating the dark or light colored spots between the light ones in granite. Immediately after applying the colored varnish, sand or other absorbing medium is sprinkled thereon in a sufficient quantity to take up any excess of varnish, which would otherwise discolor or creep under the granulated portions, and at the same time produce, if desired, the natural veins and shades in stone. After these several coatings have been applied and sufficiently dried they are backed with plaster-of-paris, cement, or other material suitable for that purpose. Different colors or grades of granites are produced by tinting a portion of the porcelain granules and employing different shades of slate, and in some cases granulated marble tinted or otherwise may be used with or without the slate. Porcelain is employed because readily obtained in any portion of the country from refuse or broken wares of that material, and because the broken edges present a polished or glazed appearance as in corresponding polished particles of granite.

In preparing the porcelain and slate or marble they should be well sifted to remove dust and other substances, which in contact with the raw varnish of the first coat would present a smeared-like appearance through the glass.

The colored varnish is prepared by mixing with ordinary varnish—such, for example, as copal—dry paints of the requisite color to produce the desired effect; and in this connection it should be stated that the effect of colored varnish over the ordinarily mixed paint is far superior, owing to the polished appearance it presents through the glass. When the granules of porcelain and slate are properly and thoroughly mixed and sprinkled on the glass, they, in conjunction with the colored varnish, produce an imitation of granite which even under a magnifying-glass is perfect to a maximum degree.

In conclusion, it may be stated that both slate and marble may be omitted and a correspondingly-colored porcelain be substituted therefor, and the sand and also the second coat of white varnish may be omitted, without departing from the essence of my invention.

Having described my process, what I claim, and desire to secure by Letters Patent, is—

1. The herein-described method of producing an imitation stone, the same consisting in coating glass with varnish, then sprinkling on said varnish while more or less raw granulated porcelain, and then applying a coat of colored varnish and covering the whole with a suitable backing.

2. The herein-described method of producing an imitation stone, the same consisting in coating glass with varnish, then sprinkling over the same while raw a mixture of granulated porcelain and slate, and then applying a further coating composed of colored varnish and afterward a backing for the whole, for the purpose set forth.

3. The herein-described method of producing an imitation stone, the same consisting in coating glass with varnish, then sprinkling over the same while raw a mixture of granulated porcelain and slate, and then applying a coating of colored varnish, and afterward adding sand thereto, and then a backing.

4. The herein-described method of producing an imitation stone, the same consisting in coating glass with varnish, then sprinkling over the same granulated porcelain, then applying over the latter a coating of colored varnish, and adding sand or other absorbent thereto, in the manner set forth.

HIRAM S. UTLEY.

Witnesses:
W. W. ELLIOTT,
JNO. G. ELLIOTT.